United States Patent [19]
Harrell et al.

[11] 3,804,176
[45] Apr. 16, 1974

[54] ADJUSTABLE STAFF FOR PEANUT SHAKER-INVERTER MACHINE

[75] Inventors: Larry Douglas Harrell; Jesse Daniels, both of Albany, Ga.

[73] Assignee: Lilliston Corporation, Albany, Ga.

[22] Filed: Feb. 26, 1973

[21] Appl. No.: 335,472

[52] U.S. Cl. ............................................... 171/101
[51] Int. Cl. .......................................... A01d 29/00
[58] Field of Search ............ 171/101, 83, 103, 104, 171/105, 136; 56/229

[56] References Cited
UNITED STATES PATENTS
| | | | |
|---|---|---|---|
| 2,684,619 | 7/1954 | Klein | 171/83 |
| 2,687,605 | 8/1954 | Persons | 171/104 |
| 2,722,794 | 11/1955 | McGee | 171/83 |
| 3,726,345 | 4/1973 | Harrell | 171/101 |

Primary Examiner—Antonio F. Guida
Attorney, Agent, or Firm—Newton, Hopkins & Ormsby

[57] ABSTRACT

The staff used with a peanut shaker-inverter to crowd the peanut plants and tip them on their sides as they are conveyed upwardly on the shaker-conveyor portion of the machine is provided with an extendible forward tip which lies substantially horizontal. The free end of this tip is pivotally attached at different elevated positions at the rear side of the plow standard. A suspended bar dangles from the trailing end of the staff to aid in assuring that the peanut plants fall in up-ended positions onto the ground surface.

6 Claims, 9 Drawing Figures

ADJUSTABLE STAFF FOR PEANUT SHAKER-INVERTER MACHINE

BACKGROUND OF THE INVENTION

This invention relates to peanut shaker-inverter machines such as those disclosed in copending application Ser. No. 137,552 filed Apr. 26, 1971 now U.S. Pat. No. 3,726,345, the disclosure of which is incorporated herein by reference.

In such machines, the peanut plants are first dug up and are then fed to a shaker-conveyor which inclines upwardly and rearwardly of the machine. The shaker-conveyor carries the spaced plants upwardly in a line ultimately for discharge back onto the ground surface but in generally inverted position thereon. As the line of plants progresses upwardly on the shaker-conveyor a staff which overlies the shaker-conveyor and crosses over the line of plants at an angle thereto causes the upstanding vines of the plants to be crowded over to one side thereby to tip the plants onto their sides. The plants then fall to the ground and in so doing encounter an arrangement of fingers which complete the desired degree of plant inversion.

It is essential that each stage of the inverting process proceeds in proper manner and that stage effected by the staff as described above depends upon the proper positioning of the staff relative to the shaker-conveyor and particularly upon attaining the proper spacing all along the length of the overlying portion of the staff.

BRIEF SUMMARY OF THE INVENTION

It is therefore of primary concern in connection with this invention to provide an improved arrangement for mounting the staffs of a peanut shaker-inverter (it is preferred that a two-row unit with two staffs be used) whereby a maximum variation in staff spacing may be accomplished in a simple and reliable manner.

Essentially, the invention involves the use of a staff having a generally horizontal forward tip which is extendible in its axial direction and is pivoted at its extremity at a selected one of a number of vertically spaced positions. In this manner, the compound effect of horizontal extension-retraction and vertical pivot shifting enables a very wide range of adjustment of the staff spacing-wise with respect to the shaker-conveyor.

The upper or trailing end of the staff is provided with a suspended extension to aid in assuring that the peanut plants end up in proper position on the ground surface.

DETAILED DESCRIPTION OF THE INVENTION

Figure 1:
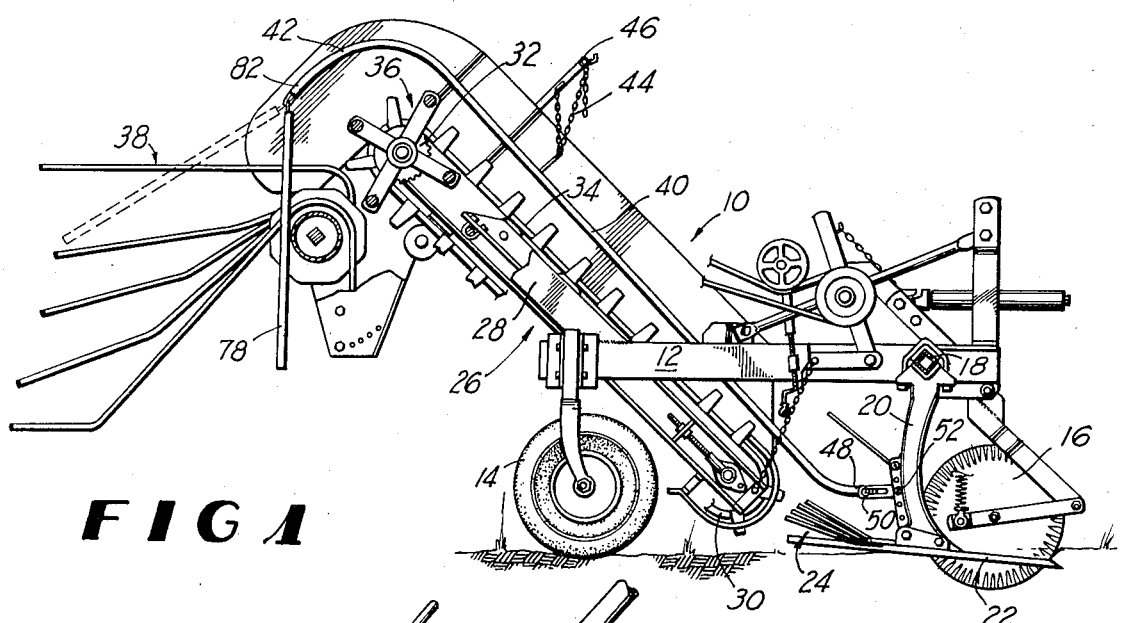
FIG. 1 is a side elevational view illustrating a peanut shaker-inverter and illustrating an embodiment of the invention.

Referring now more particularly to FIG. 1, the general arrangement of the machine disclosed in the aforementioned copending application will be apparent and with it, the general principles in accordance with the present invention will also be seen. In FIG. 1, the peanut shaker-inverter is indicated generally by the reference character 10 and includes a frame 12 having rear support wheels one of which is indicated by the reference character 14 situated generally somewhat behind the center of gravity of the machine so as to impose normally a couple tending to penetrate the forward cutting disc or discs 16 into the ground surface. The transverse frame member 18 carries preferably a pair of plow assemblies, one of which is shown in FIG. 1 and will be seen to include a depending plow standard 20 carrying the horizontal plow or cutter blade 22 at its lower extremity. Attached to the plow assembly rearwardly of the blade 22 thereof are a series of lift fingers indicated generally at 24 which tend to elevate and feed plants which have been dug up onto the shaker-conveyor assembly indicated generally by the reference character 26. The shaker-conveyor assembly includes a frame 28 having a sprocket 30 at its lower end and a drive sprocket 32 at its upper end and an endless conveyor is trained about these sprockets, the upper flight 34 of which extends upwardly and rearwardly from behind the fingers 24 to convey plants in spaced relation in a row rearwardly and upwardly ultimately for discharge over the rear end of the shaker-conveyor. As reference to the aforesaid copending application will reveal, there are two plow assemblies and two rows or lines of plants which will be elevated upwardly and rearwardly by the shaker conveyor mechanism 26. A staff is associated with each of such conveyed rows of plants and the purpose of the staff in each case is to engage the vines which are upstanding during their progress up the shaker-conveyor and crowd these vines over ultimately to tip the plants on their side so that they are discharged by the reel 36 in side-tipped relation so as to engage against the series of inverting fingers 38 ultimately to reach the ground in generally inverted relation. As is manifest from the aforesaid copending application, the two rows of plants so inverted tend to tip inwardly toward each other with the peanuts exposed uppermost along the windrow provided by the shaker-inverter.

The staffs for the two rows are characterized by deflector portions 40 which overlie the upper flight of the shaker-conveyor and are disposed all along at spaced relationship thereto, these deflector portions being angled with respect to the line of plants so as to cross over them at a shallow angle which causes the plants to be crowded over and tipped sideways as described hereinabove. The trailing or upper end of each staff is crooked over as indicated by the reference character 42 and an intermediate portion of the staff in each case is supported by chains 44 from a suitable horizontal overhead support 46 not only to adjust the angularity of the staffs with respect to the line of plants but also to achieve, in that particular region of the staff, the requisite spacing above the shaker-conveyor. The angular disposition of the staffs as well as their spacing disposition with respect to the shaker-conveyor is important in assuring that this stage of the inverting action progresses properly so that the plants reach the discharge upper end of the shaker-conveyor in the proper disposition such that the latter stages of the inverting process are fully effective to achieve the desired inverted, inwardly crowded windrow of peanut plants. Since the peanut plants themselves may vary widely as to the height, density and general size of their vines, it is important that the spacing of the deflector portion 40 of a staff be correct all along its length with respect to the underlying shaker-conveyor, thereby to achieve the proper tipping action on the plants as aforesaid. The chains 44 of course control part of this spacing but the disposition of the forward extremity of the staff also contributes materially to the overall spacing of the deflector portion 40.

In accord with the present invention, the forward extremity of the staff is disposed angularly to extend generally horizontally as indicated by the portion 48 and is provided with an extendible tip 50 which may be extended-retracted axially of its length and which reaches into pivotal connection at 52 to the rear side of the plow standard 20, substantially as is shown in FIG. 1.

Figure 3:
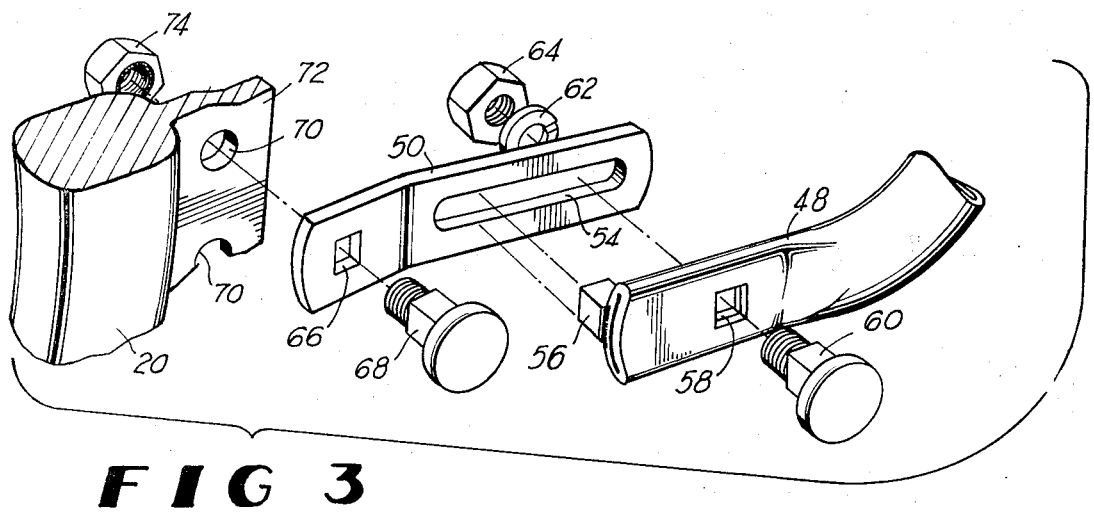
FIG. 3 is an exploded perspective view on enlarged scale illustrating the forward end of the staff.

As will be seen best in FIG. 3, the extension 50 is provided with an elongate, axially extending slot 54 whereas the horizontally extending forward portion of the staff 48 is provided at its extremity with a lug 56 which is guidably received in the slot 54 and which is also provided with a square opening 58 receiving the square shank 60 of a carriage bolt which also projects through the slot 54 and receives on its opposite side a flat washer 62 and nut 64. In this way, the tip 50 is extendible and retractable axially of its length with respect to the forward end of the staff without allowing any pivotal motion thereat, the nut 64 simply being backed off to permit extension-retraction to a desired selected position whereafter the nut is retightened to hold the adjustment. The extremity of the tip 50 is provided with a square hole 66 receiving the square shank 68 of a further carriage bolt which is projected selectively through any one of a number of vertically spaced openings 70 in the flange 72 provided on the rear side of the plow standard 20. The threaded end of this latter carriage bolt receives a lock nut 74 which is tightened only to the extent to prevent undue looseness of the carriage bolt but which allows the staff to be pivotally connected at this point. Thus, when the chain 44 is manipulated, the staff may easily pivot about its forward extremity.

Figure 2:
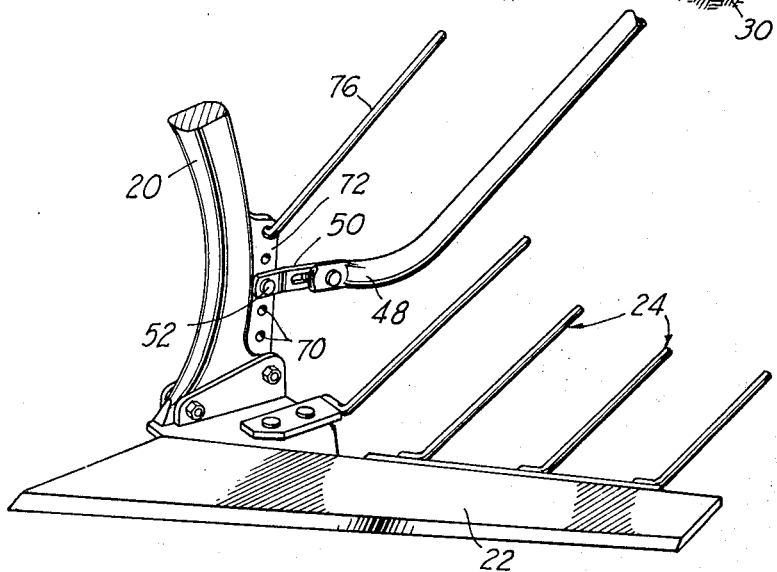
FIG. 2 is a perspective view on an enlarged scale illustrating the forward connection and construction of the staff.

However, the compound action achieved by the vertical pivot axis and the limited horizontal movement allowed as between the forward end of the staff proper and the tip or extension 50 allows a great deal of latitude and variation in the physical spacing of the deflector portion 40 of the staff with respect to the underlying surface or support afforded by the shaker-conveyor. Moreover, by connecting the staff at its forward extremity immediately behind the plow standard 20, the chance of the forward extremity of the staff fouling with the peanut vines is greatly diminished and, in order to enhance this action, an extra finger 76 may be provided immediately above the staff as is indicated clearly in FIG. 2.

Figure 4:
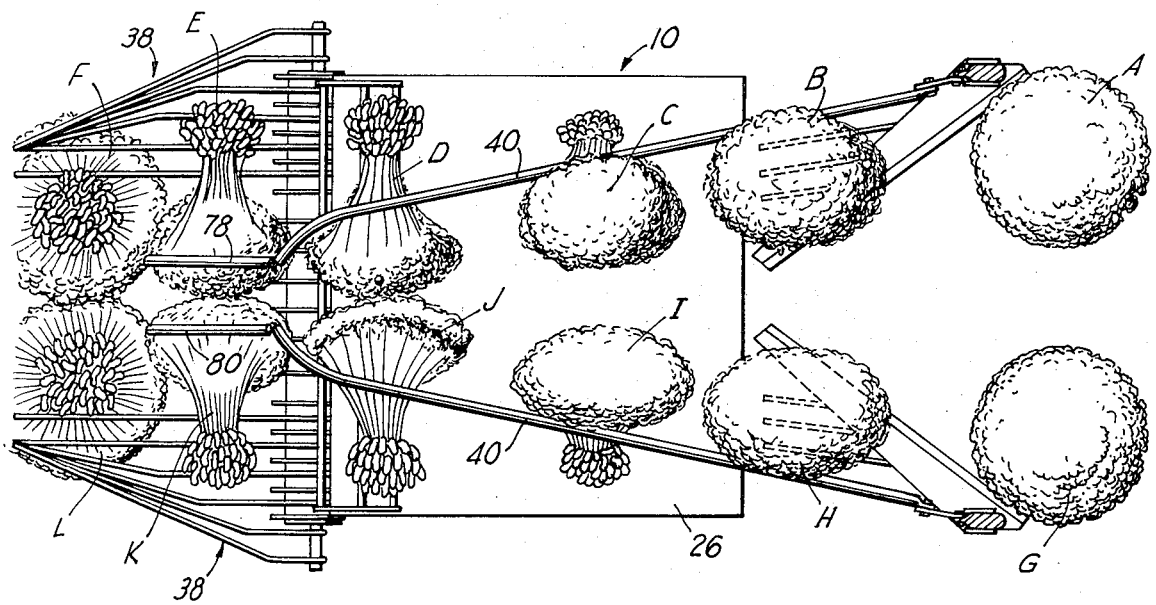
FIG. 4 is a plan view illustrating the plant-inverting process.
Figure 5:
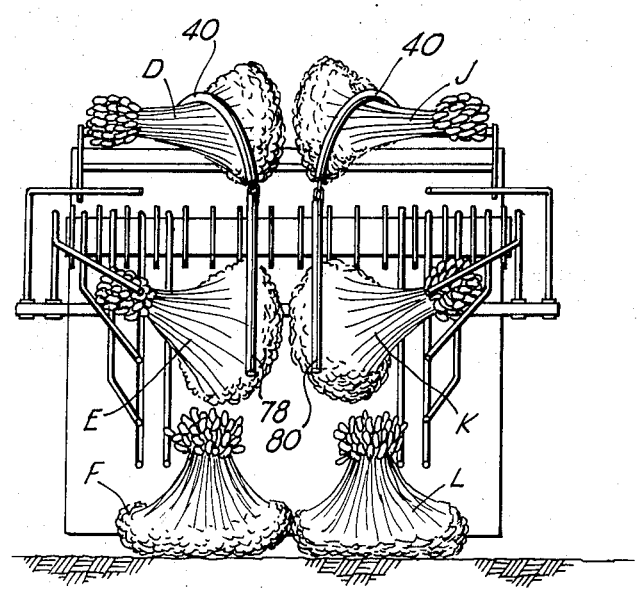
FIG. 5 is a rear elevation with respect to FIG. 4.

As noted, the manner of mounting the staff at its forward end allows optimization of the crowding action imparted by the staff to assure that the peanut plants arrive at the upper, rearward end of the shaker-conveyor in the proper orientation. This action can be seen clearly in FIG. 4 wherein successive plants in two adjacent rows are illustrated by the reference characters A, B, C, D, E, F and G, H, I, J, K, L. The plants A and G are of course still standing while the plants B and H have just been dug and are about to be picked up by the shaker-conveyor 26. The plants C and I have been moved partly up the shaker-conveyor and the staffs 40 have already crowded the vines of these plants over so that they are lying on their sides and by the time the plants have reached the upper, trailing end of the shaker-conveyor as is the case with the plants D and J, their vines have been crowded and flattened against the shaker-conveyor sufficiently to dispose the plants in positions as are shown in FIG. 5. At this point the plants are dumped off the shaker-conveyor and in the process of falling to the ground the peanut clusters strike the two sets 38 of inverting fingers as is illustrated by the plants E and K. This action tends to tumble the plants over into fully inverted position and this action is enhanced by the deflector bars 78 and 80.

As is seen clearly in FIG. 5, the upper or trailing ends of the staffs 40 are crooked to point downwardly and rearwardly over the rearward end of the shaker-conveyor and the deflector bars 78 and 80 form freely suspended extensions thereof.

Figure 6:
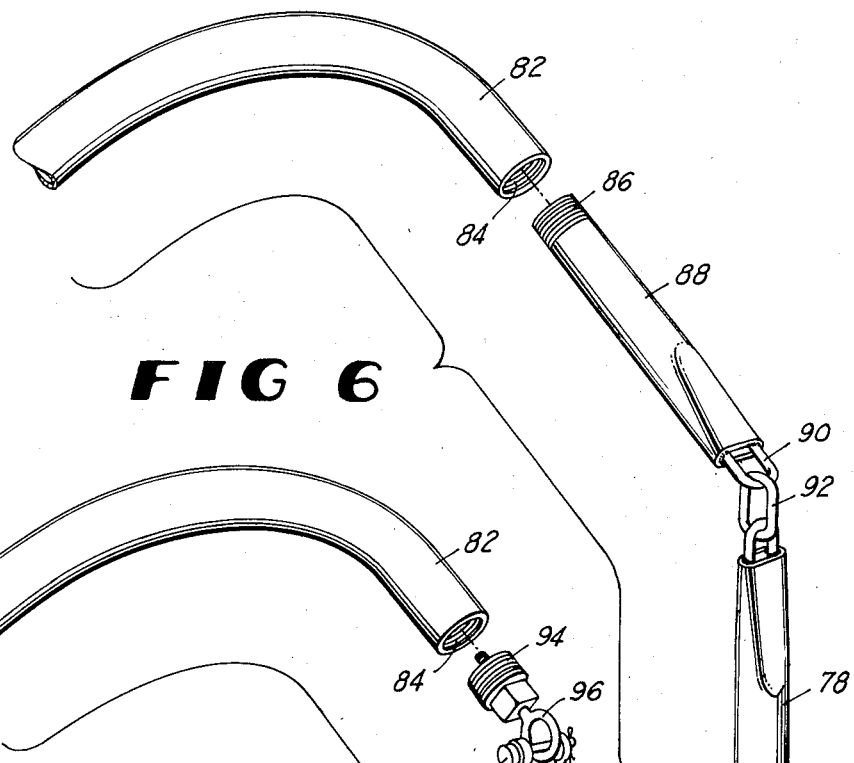
FIG. 6 is an enlarged perspective view of the trailing end of a staff and shows in exploded fashion one manner of attaching a staff extension.
Figure 7:
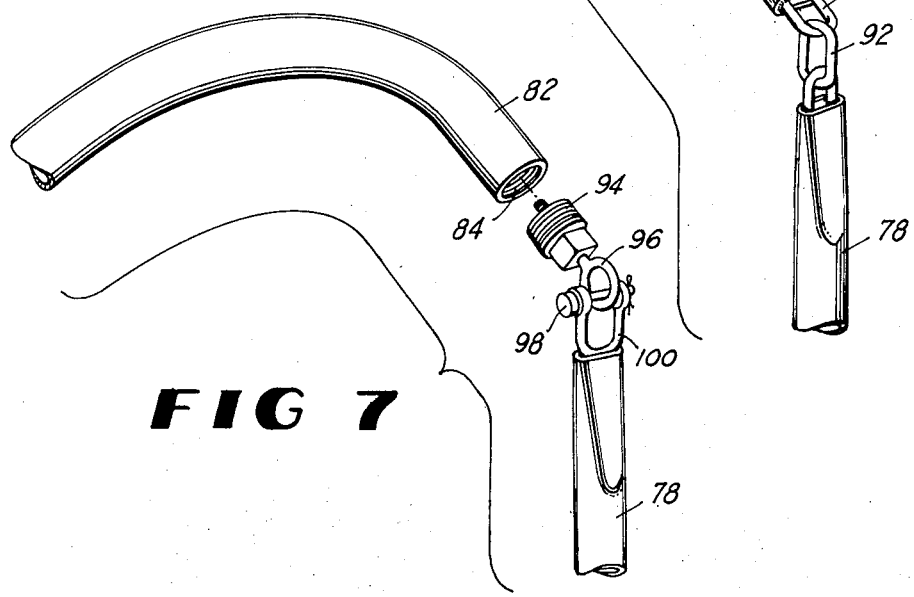
FIGS. 7–9 are views similar to FIG. 6 but showing alternative forms of attachment.

Various methods may be used to connect the crooked end 82 of a staff to its extension, some of which are shown in FIGS. 6–9. In FIG. 6, the end of the crook may be internally threaded as indicated at 84 to receive the threaded end 86 of a rigid extension piece 88. The free end of the extension piece carries the bight member 90 which, through the link 92, freely suspends the deflector bar 78 as shown. To dispose the deflector bar closer to the free end of the crook 82, a short plug 94 may be used as in FIG. 7. The plug in this case is shown with an eye 96 threaded thereinto and the removable pin 98 received in the ends of the stirrup 100 freely suspends the deflector bar in this case.

Figure 8:
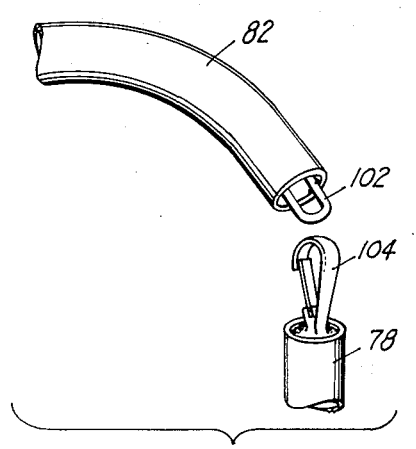

In FIG. 8, the crook 82 may be provided simply with a bight member 102 with which the snap hook 104 cooperates freely to suspend the deflector bar.

Figure 9:
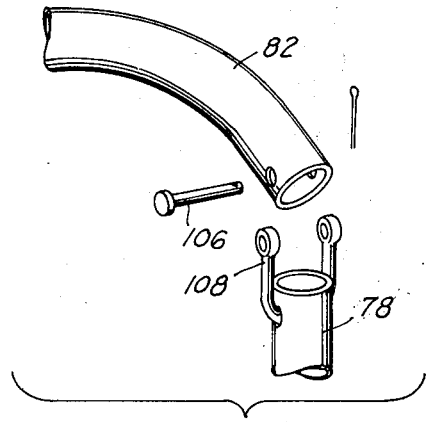

In FIG. 9, the crook 82 receives a removable pin 106 engagable through the ends of the stirrup 108 to suspend the deflector bar.

In all cases the deflector bars are free to swing in all directions although normally they merely hang downwardly as shown in FIG. 1. The deflector bars are engaged by and ride under their own weight upon the vine or stalk portions of the peanut plants so that, as reference to FIGS. 4 and 5 will show, they tend to maintain a downward deflection of the vines as the plants tumble to the ground, see the plants E and K, so that the plants land upside down as a compact windrow as indicated by the plants F and L.

What is claimed is:

1. In a peanut shaker-inverter machine having a plow standard at the forward end thereof; a shaker-conveyor extending rearwardly upwardly from behind said standard for conveying peanut plants upwardly and rearwardly for discharge into inverted relation on the ground behind the machine; and a staff having an elongate deflector portion overlying said shaker-conveyor at an angle to the direction of movement of the plants for engaging the vines of the peanut plants and crowding them over to tip the plants as they progress up the shaker-conveyor; said staff including a generally horizontal forward tip extension, means for guiding and securing said extension in selected axially displaced positions, means for suspending a rearward portion of said staff at selected spacings with respect to said shaker-conveyor, and pivot means for pivotally attaching the free extremity of said extension to the rear side of said plow standard whereby the entire length of said deflector portion of the staff may be varied spacing-wise with respect to said shaker-conveyor to optimize the crowding action of the staff.

2. In a machine as defined in claim 1 wherein said plow standard is provided with a vertically extending flange at its rear side, said flange being provided with a series of vertically spaced openings and said pivot means being selectively engagable therein.

3. In a machine as defined in claim 2 wherein said means for guiding and securing comprises an axially extending slot in said extension, a lug on said staff engaged in said slot, and a fastening member passing through said staff and said extension.

4. In a machine as defined in claim 1 wherein said means for guiding and securing comprises an axially extending slot in said extension, a lug on said staff engaged in said slot, and a fastening member passing through said staff and said extension.

5. In a machine as defined in claim 1 wherein said staff terminates in a crook portion pointing downwardly and inwardly over the rearward end of said shaker-conveyor; and a deflector bar freely suspended from said crook portion.

6. In a peanut shaker-inverter including an upwardly and rearwardly inclined shaker-conveyor; digging means at the forward end of said shaker-conveyor for digging adjacent rows of peanut plants and directing them onto said shaker-conveyor; a pair of staffs secured at their forward ends to said digging means and extending convergingly therefrom in spaced relation above said shaker-conveyor to crowd the vines of plants of said rows inwardly so that the plants lie on their sides at the rearward end of said shaker-conveyor, each staff having a crooked end portion to point downwardly and inwardly over said rearward end of the shaker-conveyor; a pair of peanut cluster-engaging means projecting below and rearwardly of said rearward end of the shaker-conveyor at opposite sides thereof for intercepting the peanut clusters of plants discharged from said shaker-conveyor thereby to tumble them in inverted condition onto the ground surface; and a deflector bar freely suspended from the extremity of each crook for riding upon the vines of the peanut plants to enhance the inversions thereof.

* * * * *